US012686808B2

(12) United States Patent
Kumar et al.

(10) Patent No.: US 12,686,808 B2
(45) Date of Patent: Jul. 21, 2026

(54) POLYMERIC WAX DEPOSITION INHIBITOR

(71) Applicants: COUNCIL OF SCIENTIFIC AND INDUSTRIAL RESEARCH, New Delhi (IN); Oil India Limited, Assam (IN)

(72) Inventors: Umesh Kumar, Dehradun (IN); Manisha Sahai, Dehradun (IN); Aruna Kukrety, Dehradun (IN); Thangaraj Senthilkumar, Dehradun (IN); Sanat Kumar, Kolkata (IN); Sudip Kumar Ganguly, Dehradun (IN); Anjan Ray, Dehradun (IN); Bijan Mahanta, Assam (IN); Rajarshi Panigrahi, Assam (IN); Neeraj Mathur, Assam (IN)

(73) Assignees: Council of Scientific and Industrial Research, New Delhi (IN); Oil India Limited, Assam (IN)

( * ) Notice: Subject to any disclaimer, the term of this patent is extended or adjusted under 35 U.S.C. 154(b) by 0 days.

(21) Appl. No.: 18/756,827

(22) Filed: Jun. 27, 2024

(65) Prior Publication Data

US 2025/0034446 A1 Jan. 30, 2025

(30) Foreign Application Priority Data

Jul. 25, 2023 (IN) ............................ 202311050247

(51) Int. Cl.
*C09K 8/524* (2006.01)
*C08F 210/14* (2006.01)
(Continued)

(52) U.S. Cl.
CPC ............ *C09K 8/524* (2013.01); *C08F 210/14* (2013.01); *C08F 220/1818* (2020.02); *C10L 1/1973* (2013.01)

(58) Field of Classification Search
CPC .. C09K 8/524; C08F 210/14; C08F 220/1818; C08F 222/06; C10L 1/1973; C10L 1/1963; C10L 10/14; C10L 10/16
See application file for complete search history.

(56) References Cited

U.S. PATENT DOCUMENTS 4,123,232 A 10/1978 Frost, Jr.
4,171,273 A 10/1979 Waldbilling et al.
(Continued)

FOREIGN PATENT DOCUMENTS

EP 84148 A2 7/1983
WO 2009/047786 A2 4/2009

OTHER PUBLICATIONS

Dau et al., Dual Polymerization Pathway for Polyolefin-Polar Block Copolymer Synthesis, J. Amer. Chem. Soc., 2020, 142, 21469-21483 (Year: 2020).*

(Continued)

*Primary Examiner* — Cephia D Toomer
(74) *Attorney, Agent, or Firm* — Merchant & Gould P.C.; Daniel R. Evans; Jenna L. Logsdon

(57) ABSTRACT

The present invention discloses a homo-polymeric and co-polymeric wax inhibitor (WI) useful for the flow of waxy crude oil and their synthesis thereof. The WI(s) comprises of any one of C14 to C24 fatty alcohol or mixture thereof in 2 mol % to 50 mol %, and an unsaturated organic acid i.e. acrylic acid, and poly alpha olefins i.e. poly alpha hexene, poly alpha octene, poly alpha decene, poly alpha dodecene of composition ranging from about 0.01 wt % to 20 wt % wherein the average molecular weight of poly alpha olefins used ranged from 1000 to 10000. A method of preparing a series of WI(s) with varying compositional ratios of the fatty
(Continued)

alcohols, acrylic acid and polyalpha olefins targeting a wide range (C17 to C65 or beyond) of wax present in waxy crude oil is also disclosed.

10 Claims, 1 Drawing Sheet

(51) Int. Cl.
*C08F 220/18* (2006.01)
*C10L 1/197* (2006.01)

(56) References Cited

U.S. PATENT DOCUMENTS

| | | | |
|---|---|---|---|
| 4,491,455 | A | 1/1985 | Ishizaki et al. |
| 7,942,941 | B2 | 5/2011 | Cravey et al. |
| 2015/0307697 | A1* | 10/2015 | Mastrangelo ........... C10L 10/16 524/562 |
| 2016/0032200 | A1 | 2/2016 | Garcia Castro et al. |
| 2019/0300811 | A1* | 10/2019 | Tsou .................... C10M 145/00 |

OTHER PUBLICATIONS

Oxford Dictionary of Chemistry, 6th edition at pp. 211-212 (2008).

* cited by examiner

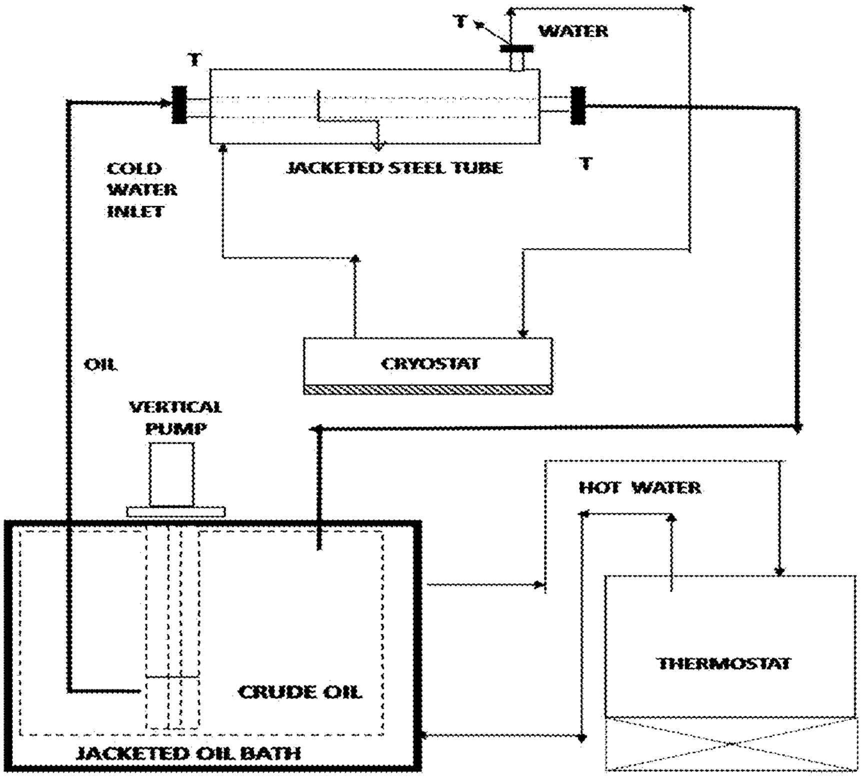
T
WATER
T
COLD
WATER
INLET
JACKETED STEEL TUBE
T
OIL
CRYOSTAT
VERTICAL
PUMP
HOT WATER
CRUDE OIL
THERMOSTAT
JACKETED OIL BATH

POLYMERIC WAX DEPOSITION INHIBITOR

FIELD OF THE INVENTION

The present invention relates to a wax inhibitor (WI) useful for the wax deposition reduction of waxy crude oil during pipeline flow. Particularly, the present invention relates to a method for the synthesis of a series of highly efficient WI useful for the wax deposition reduction of the waxy crude oil during pipeline flow. More particularly, the present invention relates to the synthesis of WI(s) using the combination of any one of C14 to C24 fatty alcohol or mixture thereof, an unsaturated organic acid i.e. acrylic acid and poly alpha olefins wherein the average molecular weight of poly alpha olefins used ranged from 1000 to 10000 based homopolymers and copolymers and their application as wax inhibitors during pipeline flow for waxy crude oils having wax in the range of C17 to C65 or beyond.

BACKGROUND OF THE INVENTION

The petroleum crude oil in underground conditions has relatively high temperatures, which keeps the high molecular weight wax hydrocarbons in liquid form. However, after its production to the surface followed by storage and transport, the produced petroleum crude oil cools down to almost atmospheric temperature leading to crystallization of waxes. The waxes present in petroleum crude oils are mainly long chain n-paraffins which crystallizes its near/below precipitation/crystallization temperature. Depending on their origin, the petroleum crude oils have different proportions (1 wt % to 30 wt %) of waxes. The precipitated/crystallized wax affects the flowability of the crude oil and may plug the pipelines at higher amount of wax getting deposited.

The wax deposition via precipitation/crystallization from crude oil also depends on natural temperature conditions. Deposition may vary depending on the seasons and topography i.e. temperature and slope of the pipeline. The presence of additive can prevent precipitation/crystallization/deposition of paraffin wax at adverse pipeline conditions. Suitable additives firstly prevent the formation of house of-cards-like structures of paraffinic molecules, which are responsible for problems restricting assured pipeline flow of crude oil. These additives are also known as flow improvers and some of these flow improvers additives can prevent the deposition of waxes on pipeline surfaces/storage tanks used for the transport/storage of crude oils.

The wax deposition in crude oil can be reduced by suitable additives. This can prevent wax from precipitating/deposition during its flow produced crude oil in pipeline. Suitable additives can promote the formation of fine, well-crystallized, non-agglomerating paraffin crystals, such that undisrupted oil transport is ensured. Such additives are also referred to as flow improvers. Wax inhibitors refer to those substances intended to prevent the deposition of paraffin waxes on surfaces in contact with crude oils or other wax-containing oils and/or mineral oil products.

EP84148A2 discloses the use of ethylene copolymers as flow improvers. These flow improvers are the copolymers of ethylene and unsaturated esters.

U.S. Pat. No. 4,171,273A disclosed a fatty alkyl succinate ester and succinimide modified copolymers of ethylene and an alpha-olefin, such as an ethylene-propylene copolymer ($\overline{M}_n$=10,000 to 100,000) prepared in presence of a free radical initiator and then modified with mixtures of C2 to C12 n-alcohol and amine such as N-aminopropylmorpholine or dimethylamino propyl amine to form a V1 improver-dispersant-pour point depressant for crude/mineral oil products.

U.S. Pat. No. 7,942,941B2 provides alpha olefin and maleic anhydride copolymer modified with pre-melted tallowamine having molecular weight ranging 2,000-5,000 measured by vapor pressure osmometry. The low temperature properties improved by using 0.01 wt % to 1 wt % of the pour point depressant for crude oils.

U.S. Pat. No. 4,123,232 disclosed ethanolamine and alpha olefin oxide copolymer to yield a product having a molecular weight of 526 to be used as V1 improver-dispersant-pour point depressant additive for crude/mineral oils.

U.S. Pat. No. 4,491,455 prepared esters of nitrogen-containing compounds having polyhydroxyl groups with 2-10 hydroxyl groups, and linear saturated fatty acids having 12-30 carbon atoms to fuel oils. The developed molecules were used for improving the cold flow of fuel oils.

US20160032200A1 and WO2009/047786A2 disclosed a polymer/copolymer obtained by free-radical polymerization of at least two different alkyl (meth)acrylates having linear C12 to C60 alkyl radicals and/or branched C1 to C11 alkyl radicals and/or cyclic C5 to C20 alkyl radicals in the presence of at least one ethylene-vinyl ester. The prepared polymeric compositions were used as pour point depressants (PPD's) for crude oils or mineral oils.

All the above patents describe the synthesis of copolymers for improving flow of crude oils, but these are limited in applications to only crude oils having paraffins in the carbon range up to C65 or beyond. Therefore, it is needed to develop the new flow improvers which target the paraffin carbon range up to C65 or beyond.

OBJECTIVES OF THE INVENTION

Main objective of the present invention is to provide wax inhibitor (WI) homo and copolymers of fatty alcohol acrylic esters and polyalpha olefins useful for the flow of waxy crude oil having wide range of waxes with carbon number up to 65 or beyond.

Another objective of the present invention is to provide a method for the synthesis of WI(s).

Yet another objective of the present invention is to provide a method for the synthesis of WI using any one or more of C14 to C24 fatty alcohol, and an unsaturated organic acid i.e. acrylic acid and poly alpha olefins i.e. poly alpha hexene, poly alpha octene, poly alpha decene, poly alpha dodecene with polyolefins ranging from about 0.01 wt % to 20 wt % wherein the average molecular weight of poly alpha olefins used ranges from 1000 to 10000.

Yet another objective of the present invention is to ensure more than 70% yield of WI(s) by using optimized reaction conditions such as time, temperature, catalyst amount, and feed to initiator ratio.

Yet another objective of the present invention is to use the produced WI(s) for the wax deposition reduction of waxy crude oils having wide range of waxes with carbon number up to 65 or beyond.

Yet another objective of the present invention is to use the produced WI(s) for the wax deposition reduction of waxy crude oils in different dosage amount.

Yet another objective of the present invention is to optimize the dose amount of WI(s) to get more than 70% wax deposition reduction in waxy crude oils.

SUMMARY OF THE INVENTION

Accordingly, the present invention provides a wax inhibitor, comprising copolymers of a) 2 mol % to 50 mol % of C14 to C24 fatty alcohol;

b) 2 mol % to 50 mol % of unsaturated organic acid; and c) 0.01 wt % to 20 wt % of a polyalpha olefin, wherein a fatty alcohol acrylate formed from the fatty alcohol and unsaturated organic acid is copolymerised with polyalpha olefin.

In a preferred embodiment of the claimed invention, the unsaturated organic acid is selected from the group consisting of acrylic acid, maleic anhydride, and maleic acid.

In a preferred embodiment of the claimed invention, the fatty alcohol is selected from the group consisting of C14, C16, C18, C20, C22 and C24 alcohol.

In a preferred embodiment of the claimed invention, the polyalpha olefin is selected from the group consisting of poly alpha hexene, poly alpha octene, poly alpha decene, poly alpha dodecene.

In a preferred embodiment of the claimed invention, the wax inhibitor is selected from the group consisting of:

i. copolymer of C14 fatty alcohol acrylate with polyalpha hexene (PMA-24);

ii. copolymer of C16 fatty alcohol acrylate with polyalpha hexene (PMA-25);

iii. copolymer of C18 fatty alcohol acrylate with polyalpha hexene (PMA-26);

iv. copolymer of C20 fatty alcohol acrylate with polyalpha hexene (PMA-27);

V. copolymer of C22 fatty alcohol acrylate with polyalpha hexene (PMA-28);

vi. copolymer of C24 fatty alcohol acrylate with polyalpha hexene (PMA-29);

vii. copolymer of C14 fatty alcohol acrylate with polyalpha octene (PMA-30);

viii. copolymer of C16 fatty alcohol acrylate with polyalpha octene (PMA-31);

ix. copolymer of C18 fatty alcohol acrylate with polyalpha octene (PMA-32);

X. copolymer of C20 fatty alcohol acrylate with polyalpha octene (PMA-33);

xi. copolymer of C22 fatty alcohol acrylate with polyalpha octene (PMA-34);

copolymer of C24 fatty alcohol acrylate with polyalpha octene (PMA-35); xii.

xiii. copolymer of C14 fatty alcohol acrylate with polyalpha decene (PMA-36);

xiv. copolymer of C16 fatty alcohol acrylate with polyalpha decene (PMA-37);

xv. copolymer of C18 fatty alcohol acrylate with polyalpha decene (PMA-38);

xvi. copolymer of C20 fatty alcohol acrylate with polyalpha decene (PMA-39);

xvii. copolymer of C22 fatty alcohol acrylate with polyalpha decene (PMA-40);

xviii. copolymer of C24 fatty alcohol acrylate with polyalpha decene (PMA-41);

xix. copolymer of C14 fatty alcohol acrylate with polyalpha dodecene (PMA-42);

xx. copolymer of C16 fatty alcohol acrylate with polyalpha dodecene (PMA-43);

xxi. copolymer of C18 fatty alcohol acrylate with polyalpha dodecene (PMA-44);

xxii. copolymer of C20 fatty alcohol acrylate with polyalpha dodecene (PMA-45);

xxiii. copolymer of C22 fatty alcohol acrylate with polyalpha dodecene (PMA-46);

xxiv. copolymer of C24 fatty alcohol acrylate with polyalpha dodecene (PMA-47);

xxv. copolymer of C14-C24 fatty alcohol acrylates as per PMA-22 with polyalpha decene (PMA-48)

xxvi. copolymer of C14-C24 fatty alcohol acrylates as per PMA-23 with polyalpha decene (PMA-49)

xxvii. copolymer of C14-C24 fatty alcohol acrylates as per PMA-22 with polyalpha olefin of C6-C12 (PMA-50)

xxviii. copolymer of C14-C24 fatty alcohol acrylates as per PMA-23 with polyalpha olefin of C6-C12 (PMA-51)

xxix. copolymer of C14-C24 fatty alcohol acrylates as per PMA-23 with polyalpha dodecene of 0.01 wt % (PMA-52)

xxx. copolymer of C14-C24 fatty alcohol acrylates as per PMA-23 with polyalpha dodecene of 20.0 wt % (PMA-53)

The present invention provides a process for the synthesis of wax inhibitor comprising copolymers of a) 2 mol % to 50 mol % of C14 to C24 fatty alcohol;

b) 2 mol % to 50 mol % of unsaturated organic acid; and c) 0.01 wt % to 20 wt % of polyalpha olefin, comprising the steps of:

a. reacting a fatty alcohol and an unsaturated organic acid at a ratio ranging from 1:1 to 1:1.5 in the presence of a solvent, to obtain a first reaction mixture;

b. mixing the first reaction mixture as obtained in step (a) with a catalyst and a polymerization inhibitor in presence of a solvent and homogenizing for 1 to 15 mins, followed by heating at a temperature in the range of 40° C. to 150° C. for a period in a range of 2 to 24 hours to obtain a monomer of fatty alcohol acrylate;

c. solubilising the monomer obtained in step (b) in an organic solvent and mixing with a polyalpha olefin in the presence of a polymerization initiator at a temperature in the range of 30° C. to 120° C. for a period in the range of 2 to 24 hours to obtain a second reaction mixture; and d. precipitating the second reaction mixture obtained in step (c) with an alcohol to obtain the wax inhibitor, wherein the ratios of fatty alcohol, unsaturated organic acid and poly alpha olefin are in the range of 0.495:0.495:0.01 to 0.40:0.40:0.20.

In an embodiment of the invention, the solvent is selected from the group consisting of benzene, ethylbenzene, toluene, xylenes, meistylene, trichlorobenzene, $CHCl_3$, THF, dioxane, and DMF.

In an embodiment of the invention, the catalyst is selected from the group consisting of HCl, $HNO_3$, $H_2SO_4$, $HClO_4$, $H_3PO_4$, $H_3PO_3$, organic acids, p-toluene sulfonic acid, alkali hydroxide, alkali oxides, carbonates, bicarbonates, alkali earth metal hydroxides, oxides, carbonates, bicarbonates and amberlyte resin.

In a preferred embodiment of the invention, the polymerization initiator is selected from the group consisting of benzoyl peroxide, 2,2'-azobis(isobutyrlonitrile), tert-butyl hydrogen peroxide and $H_2O_2$.

In a preferred embodiment of the invention, the polymerization inhibitor is selected from the group consisting of from the group hydroquinone (HQ), 4-tert butyl catechol, methoxy hydroquinone (MEHQ), butylated hydroxyl toluene (BHT) and mixture thereof.

In an embodiment of the invention, the alcohol for precipitating the polymers in step (d) is selected from the group consisting of methanol, ethanol, propanol, and isopropanol.

The present invention provides a process for reducing wax deposition in waxy crude oil, comprising:

a. dissolving the wax inhibitor composition as mentioned above, in a solvent selected from a group consisting of hexane, heptanes, toluene, benzene, ethyl benzene, xylenes or a mixture thereof at a concentration of 0.01 to 70%; and
b. adding the dissolved composition to the waxy crude oil at a concentration in the range of 5 ppm-10000 ppm by weight at a temperature 5° C.-10° C. above the wax appearing temperature (WAT) of the crude oil.

The present invention describes a method for the synthesis of homo and copolymers of one or more of C14 to C24 alcohol acrylates and polyalpha olefins of C6 to C12 alpha olefins also for the flow property improvement of waxy crude oils having high carbon number of paraffins extending up to 65 or beyond. More particularly, this invention involves flow property improvement by reducing the wax deposition rate in oil pipeline using developed flow improver additives (wax inhibitors). The polymer acrylate of oleyl alcohol was synthesized by the following method 1. Acrylates C14 to C24 alcohol were prepared by using one of the C14 to C24 alcohol mixed with acrylic acid and catalyst at elevated temperature. The individual and mixture polyalpha olefins of C6 to C12 alpha olefins were prepared using one of the C6 to C12 alpha olefins or their mixture and catalyst at lower than the atmospheric temperature 2 Polymerization of one of the C14 to C24 alcohol or their mixture acrylate under inert atmosphere was done using free radical polymerization at elevated temperature. The copolymers of one of the C14 to C24 alcohol or their mixture acrylate and or individual and mixture polyalpha olefins of C6 to C12 alpha olefins of different combination from 100:0.01 wt % to 0.01:100 wt % of both. After the additives synthesis, it is dried and mixed with waxy crude oil having high paraffinic carbon number up to C65 or beyond in different dosage. A reduction in wax deposition of up to 91% was observed at different temperatures and dosage.

These and other features, aspects, and advantages of the present subject matter will be better understood with reference to the following description. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF THE DRAWINGS

The following drawings form a part of the present specification and are included to further illustrate aspects of the present disclosure. The disclosure may be better understood by reference to the drawings in combination with the detailed description of the specific embodiments presented herein.

FIG. 1 depicts the schematic diagram of flow loop assembly, in accordance with an embodiment of the present disclosure.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of elements or steps but not the exclusion of any other element or step or group of elements or steps.

The term "including" is used to mean "including but not limited to". "Including" and "including but not limited to" are used interchangeably.

The term "wax inhibitor" denoted as WI, refers to substances which control the growth of wax crystals through nucleation, co-crystallization, adsorption, and dispersion interactions which is useful for the flow of waxy crude oil through pipelines. In an aspect of the present disclosure, there is provided a comprising copolymer of a) 2 mol % to 50 mol % of C14 to C24 fatty alcohol; b) 2 mol % to 50 mol % of an unsaturated organic acid; and c) 0.01 wt % to 20 wt % of a polyalpha olefin, wherein a fatty alcohol acrylate formed from the fatty alcohol and unsaturated organic acid is copolymerised with polyalpha olefin.

The term "fatty alcohol" refers to alcoholic compounds having at least 12 number of carbons. In an aspect of the present disclosure, the fatty alcohol is selected from the group consisting of C14, C16, C18, C20, C22 and C24 alcohol.

The term "unsaturated organic acid" refers to organic acids comprising unsaturated (alkenyl or alkynyl) chains. In an aspect of the present disclosure, the unsaturated organic acid is selected from the group consisting of acrylic acid, maleic anhydride, and maleic acid.

The term "polyalpha olefin" refers to hydrocarbon polymers prepared by the polymerisation of terminal alkenes which are commonly used as base oil and lubricants. In an aspect of the present disclosure, the polyalpha olefin is selected from the group consisting of poly alpha hexene, polyalpha octene, polyalpha decene, and polyalpha dodecane.

The term "copolymer" refers to a polymer obtained by polymerising two different types of monomers. In an aspect of the present disclosure, there is provided a wax inhibitor comprising copolymers of (a) 2 mol % to 50 mol % of C14 to C24 fatty alcohol; (b) 2 mol % to 50 mol % of an unsaturated organic acid; and (c) 0.01 wt % to 20 wt % of a polyalpha olefin, wherein a fatty alcohol acrylate formed from the fatty alcohol and unsaturated organic acid is copolymerised with the polyalpha olefin.

In an embodiment of the present invention a wax inhibitor additive composition has been synthesized that comprises of at homo and copolymers of fatty alcohol acrylate (synthesized from fatty alcohols) with poly alpha olefins.

In yet another embodiment of the present invention the synthesis of WI(s) utilizes fatty alcohol of C14 to C24, acrylic acid and poly alpha olefins.

The present invention provides for the synthesis of wax inhibitors comprising homo and co-polymers of fatty alcohol acrylate and poly alpha olefins.

In yet another embodiment of the present invention the synthesis of WI(s) comprises copolymers of fatty alcohol acrylate and poly alpha olefins where poly alpha olefins are selected from the group consisting of poly alpha hexene, poly alpha heptene, poly alpha octane, poly alpha decene and poly alpha dodecene.

In yet another embodiment of the present invention in the synthesis of WI(s) the polyalpha olefins are used in the molecular weight range of 1000 to 10000 g/mol in the percent ratio of 0.01 wt % to 20 wt %.

In yet another embodiment of the present invention relates to a wax inhibitor additive composition comprising the aforementioned WI(s) additive and a compatible solvent thereof including hexane, heptanes, benzene, ethylbenzene, toluene, xylenes, meistylene, trichlorobenzene, $CHCl_3$, THF, dioxane, DMF. In yet another embodiment, the invention provides an oil composition with improved low temperature flow properties comprising crude oils and an amount of the aforementioned wax inhibitor additive and/or additive concentrate to reduce the wax deposition.

In yet another embodiment the molecular weight of the homo and copolymers ranges from Mn=1000 to 10000 as used as WI(s) additive in the concentration range from 0.01 wt % to 20 wt % used to prepare the copolymers with fatty alcohol acrylates to prepare the WIs.

In yet another embodiment, newly designed additives inhibit the wax deposition up to 91% in comparison to neat/undoped crude oil.

In another embodiment, this invention ensures the flowability of crude oils with high paraffinic carbon number in pipeline at temperature as low as 10° C. or lower using aforementioned WI(s).

The poly (fatty acrylate) and poly (fatty acrylate-co-alpha olefin) of the present invention are provided in formula I and II, wherein R1 is selected from C14 to C24 fatty alcohol acrylate chains and R2 is varied from poly alpha olefins of C6 to C12 alkyl chain length with one unsaturation at alpha position.

I

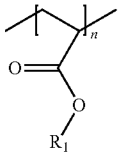

Poly(fatty acrylate)

$R_1 = C_{14}H_{29}, C_{16}H_{33}, C_{18}H_{37}, C_{20}H_{41}, C_{22}H_{45}, C_{24}H_{49}$

-continued

II

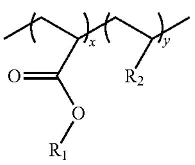

Poly(fattyacrylate-co-alpha olefins)

$R_2$ = Polyalpha hexene, polyalpha heptene, polyalpha octene, polyalpha nonene, polyalpha decene, polyalpha dodecene The polymeric additives presented in the invention are synthesized by reacting a (a) one or more fatty acrylates monomers ranging from C14 to C24, with (b) polyalpha olefin with C6 to C12 chain length in the presence of free radical initiator such as, for example, benzoyl peroxide (BPO), 2,2'-azobis(isobutyrlonitrile), (AIBN), tert-butyl peroxybenzoate but not limited to these. in order to form (c) a high molecular weight homo or copolymer with molecular weight range from Mn=1000-10000.

The fatty alcohol acrylate monomers are synthesized by reacting a (a) any one or more of fatty alcohol C14 to C24 with (b) unsaturated organic acid for example include but not limited to, acrylic acid, in the presence of inorganic acids selected from HCl, $HNO_3$, $H_2SO_4$, $HClO_4$, $H_3PO_4$, or $H_3PO_3$, organic acids such as p-toluene sulfonic acid (p-TSA), alkali hydroxide, alkali oxides, alkali carbonates, alkali bicarbonates, or alkali earth metal hydroxides, alkali earth metal oxides, alkali earth metal carbonates, alkali earth metal bicarbonates, amberlyte resin. The polymerization inhibitors from the group hydroquinone (HQ), 4-tert butyl catechol, methoxy hydroquinone (MEHQ), butylated hydroxyl toluene (BHT) but not limited to these used for inhibiting the polymerization during fatty alcohol acrylate monomer synthesis.

The polymer may be made by any of the methods known in the art, e.g., by solution polymerization with free radical initiation, conveniently carried out in a round bottom flask, or autoclave reactor or batch reactor. The solvent for solution polymerization are benzene, ethylbenzene, toluene, xylenes, meistylene, trichloro benzene, $CHCl_3$, THF, dioxane, and DMF but not limited to these.

The WI(s) additive of the present invention is especially useful in crude and/or fuel oils having relatively high wax content, e.g., a wax content of 0.1 wt % to 50 wt % by weight per weight of crude/or fuel oils, preferably 1 wt % to 10 wt %.

The synthesized WI(s) additives from PMA-1 to PMA-53 form a stable solution in hexane, heptane, benzene, ethylbenzene, toluene, xylenes, meistylene, trichloro benzene, $CHCl_3$ and THF and the additives of solution from 0.01 wt % to 70 wt %.

Although the subject matter has been described in considerable detail with reference to certain examples and implementations thereof, other implementations are possible.

EXAMPLES

The disclosure will now be illustrated with following examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

The following examples are given by way of illustration only and, therefore should not be construed to limit the scope of the present invention. The homo and copolymers of fatty alcohol acrylates and polyalpha olefins were prepared by (1) esterification of fatty alcohol (C14, C16, C18, C20, C22 and C24 fatty alcohol) with acrylic acid in toluene to produce fatty alcohol acrylates, (2) homo and copolymerization of fatty alcohol acrylates in toluene (3) preparation of polyalpha olefins from alpha olefins of C6 to C12 alkyl chain length (4) copolymerization of fatty alcohol acrylates with polyalpha olefins in toluene. The polymerization of C14, C16, C18, C20, C22 C24 fatty alcohol acrylates and different polyalpha olefins are provided below.

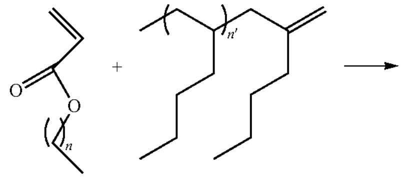

Acrylates of fatty alcohol

Polyhexene

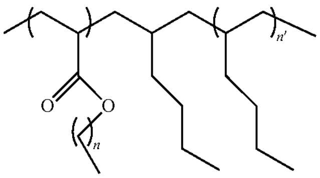

Poly(acrylates-co-polyhexene)

n = 13, 15, 17, 19, 21, 23

Co poly fatty alcohol acrylates (mixture) prepared by polymerization of C14, C16, C18, C20, C22 C24 fatty alcohol acrylates and poly alpha hexene.

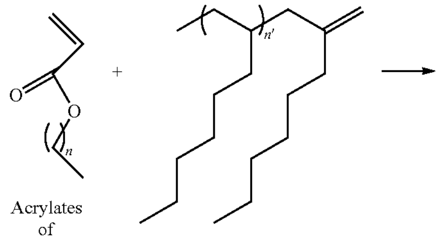

Acrylates of fatty alcohol

Polyoctene

-continued

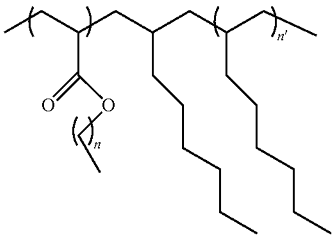

Poly(acrylates-co-polyoctene)

n = 13, 15, 17, 19, 21, 23

Co poly fatty alcohol acrylates (mixture) prepared by polymerization of C14, C16, C18, C20, C22 C24 fatty alcohol acrylates and poly alpha octene.

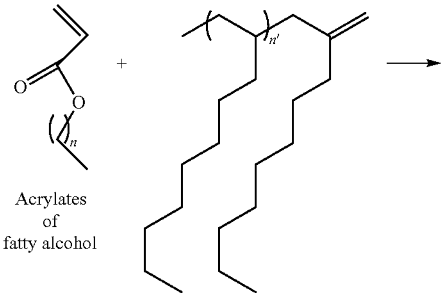

Acrylates of fatty alcohol

Polydecene

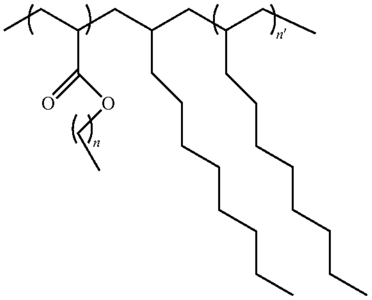

Poly(acrylates-co-polydecene)

n = 13, 15, 17, 19, 21, 23

Co poly fatty alcohol acrylates (mixture) prepared by polymerization of C14, C16, C18, C20, C22 C24 fatty alcohol acrylates and poly alpha decene.

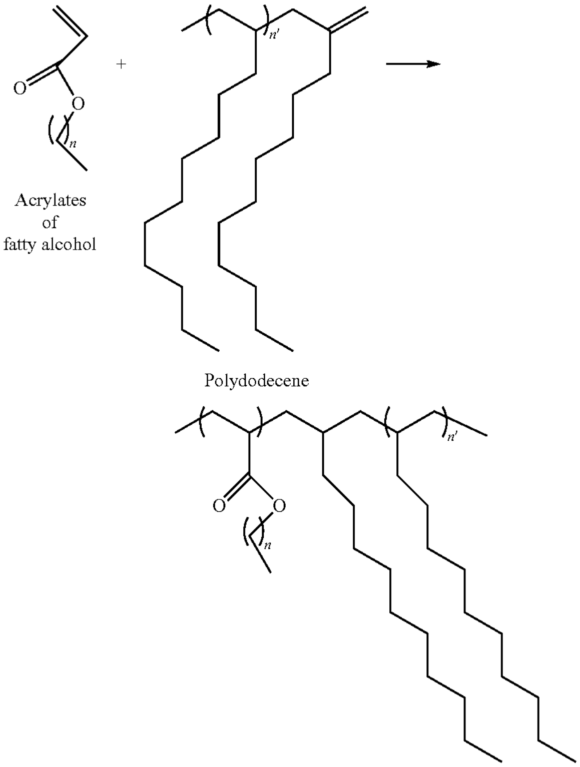

Acrylates of fatty alcohol

Polydodecene

Poly(acrylates-co-polydodecene)

n = 13, 15, 17, 19, 21, 23

Co poly fatty alcohol acrylates (mixture) prepared by polymerization of C14, C16, C18, C20, C22 C24 fatty alcohol acrylates and poly alpha dodecene.

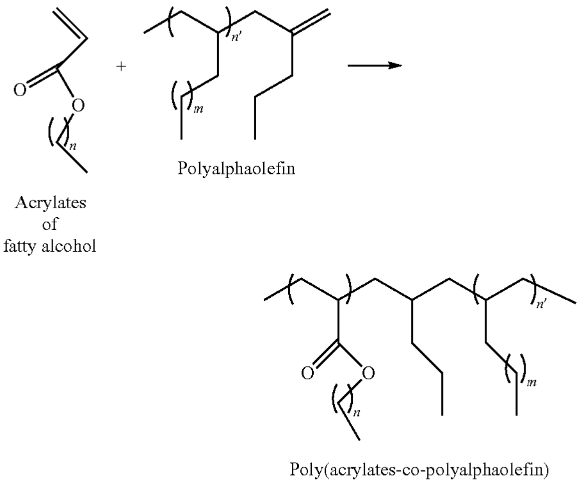

Acrylates of fatty alcohol

Polyalphaolefin

Poly(acrylates-co-polyalphaolefin)

n = 13, 15, 17, 19, 21, 23
m = 1, 3, 5, 7

Co poly fatty alcohol acrylates (mixture) prepared by polymerization of C14, C16, C18, C20, C22 C24 fatty alcohol acrylates and poly alpha olefins of hexane, octene, decene, and dodecene mixture.

Further detailed synthesis of WIs is given in the examples.

Example 1: Synthesis of C14 Acrylate

The C14 alkyl acrylate monomer was synthesized by esterification route using acrylic acid and C14 alcohol. The synthesis of C-14 acrylate, 7.2 g of acrylic acid was mixed with 21.4 g of C14 alcohol, 0.7 wt % of p-TSA, 0.1 g of hydroquinone (HQ) in toluene (300 mL) as solvent in a reactor of 500 mL capacity fitted with dean stark assembly connected to chiller bath for condensation of vapours. The mixture was refluxed with uniform heating set up and also to overcome excess heating phenomenon. After the esterification reaction, $H_2O$ molecules were obtained that indicated the completion of reaction. The resultant C14 acrylate monomer was washed with excess amount of de-ionized water and dried.

Example 2: Synthesis of C16 Acrylate

The C16 acrylate synthesis methodology was adopted as described in the example 1 where 24.2 g of C16 alcohol and 7.28 g of acrylic acid were used.

Example 3: Synthesis of C18 Acrylate

The C18 acrylate synthesis methodology was adopted as described in the example 1 where 27.49 g of C18 alcohol and 7.28 g of acrylic acid were used.

Example 4: Synthesis of C20 Acrylate

The C20 acrylate synthesis methodology was adopted as described in the example 1 where 29.85 g of C20 alcohol and 7.28 g of acrylic acid were used.

Example 5: Synthesis of C22 Acrylate

The C22 acrylate synthesis methodology was adopted as described in the example 1 where 32.66 g of C22 alcohol and 7.28 g of acrylic acid were used.

Example 6: Synthesis of C24 Acrylate

The C24 acrylate synthesis methodology was adopted as described in the example 1 where 35.46 g of C24 alcohol and 7.28 g of acrylic acid were used.

Example 7: Synthesis of PMA-1

Synthesis of homopolymer of C14 acrylate monomer was prepared by free radical polymerization in toluene solvent. C14 acrylate of 2.68 g was charged in a reactor and then BPO as an initiator of 0.7 wt % of reactant amount was added as a toluene solution through liquid injection method. The resultant reaction mixture was stirred at 500 rpm, 80° C. for 6 h under inert atmosphere. The resulting mixture was precipitated with methanol and obtained solid was separated, washed with methanol and dried under vacuum. The obtained WI was labelled as PMA-1.

Example 8: Synthesis of PMA-2

The polymerization methodology was adopted as described in the example 7 where the C16 acrylate monomer weight is 2.96 g. The obtained WI was labelled as PMA-2.

Example 9: Synthesis of PMA-3

The polymerization methodology was adopted as described in the example 7 where the C18 acrylate monomer weight is 3.24 g. The obtained WI was labelled as PMA-3.

Example 10: Synthesis of PMA-4

The polymerization methodology was adopted as described in the example 7 where the C20 acrylate monomer weight is 3.52 g. The obtained WI was labelled as PMA-4.

Example 11: Synthesis of PMA-5

The polymerization methodology was adopted as described in the example 7 where the C22 acrylate monomer weight is 3.80 g. The obtained WI was labelled as PMA-5.

Example 12: Synthesis of PMA-6

The polymerization methodology was adopted as described in the example 7 where the C24 acrylate monomer weight is 4.08 g. The obtained WI was labelled as PMA-6.

Example 13: Synthesis of PMA-7

The polymerization methodology was adopted as described in the example 7 where the C14 and C16 acrylate monomer weight are 2.68 and 2.96 g respectively. The obtained WI was labelled as PMA-7.

Example 14: Synthesis of PMA-8

The polymerization methodology was adopted as described in the example 7 where the C14 and C18 acrylate monomer weight are 2.68 and 3.24 g respectively. The obtained WI was labelled as PMA-8.

Example 15: Synthesis of PMA-9

The polymerization methodology was adopted as described in the example 7 where the C14 and C20 acrylate monomer weight are 2.68 and 3.52 g respectively. The obtained WI was labelled as PMA-9.

Example 16: Synthesis of PMA-10

The polymerization methodology was adopted as described in the example 7 where the C14 and C22 acrylate monomer weight are 2.68 and 3.80 g respectively. The obtained WI was labelled as PMA-10.

Example 17: Synthesis of PMA-11

The polymerization methodology was adopted as described in the example 7 where the C14 and C24 acrylate monomer weight are 2.68 and 4.08 g respectively. The obtained WI was labelled as PMA-11.

Example 18: Synthesis of PMA-12

The polymerization methodology was adopted as described in the example 7 where the C16 and C18 acrylate monomer weight are 2.96 and 3.24 g respectively. The obtained WI was labelled as PMA-12.

Example 19: Synthesis of PMA-13

The polymerization methodology was adopted as described in the example 7 where the C16 and C20 acrylate monomer weight are 2.96 and 3.52 g respectively. The obtained WI was labelled as PMA-13.

Example 20: Synthesis of PMA-14

The polymerization methodology was adopted as described in the example 7 where the C16 and C22 acrylate monomer weight are 2.96 and 3.80 g respectively. The obtained WI was labelled as PMA-14.

Example 21: Synthesis of PMA-15

The polymerization methodology was adopted as described in the example 7 where the C16 and C24 acrylate monomer weight are 2.96 and 4.08 g respectively. The obtained WI was labelled as PMA-15.

Example 22: Synthesis of PMA-16

The polymerization methodology was adopted as described in the example 7 where the C18 and C20 acrylate monomer weight are 3.24 and 3.52 g respectively. The obtained WI was labelled as PMA-16.

Example 23: Synthesis of PMA-17

The polymerization methodology was adopted as described in the example 7 where the C18 and C22 acrylate monomer weight are 3.24 and 3.80 g respectively. The obtained WI was labelled as PMA-17.

Example 24: Comparative Example

The poly alpha olefins were prepared by using C6, C7, C8, C10 and C12 alpha olefins individually or their mixture with $BF_3$ catalyst and butanol at 10° C. for 2 h. The reaction products were separated and stored in inert atmosphere.

Example 25: Synthesis of PMA-18

The polymerization methodology was adopted as described in the example 7 where the weights of C18 and C24 acrylate monomer were 3.24 and 4.08 g respectively. The obtained WI was labelled as PMA-18.

Example 26: Synthesis of PMA-19

The polymerization methodology was adopted as described in the example 7 where the weights of C20 and C22 acrylate monomer were 3.52 and 3.80 g respectively. The obtained WI was labelled as PMA-19.

Example 27: Synthesis of PMA-20

The polymerization methodology was adopted as described in the example 7 where the weights of C20 and C24 acrylate monomer were 3.52 and 4.08 g respectively. The obtained WI was labelled as PMA-20.

Example 28: Synthesis of PMA-21

The polymerization methodology was adopted as described in the example 7 where the weights of C22 and C24 acrylate monomer were 3.80 and 4.08 g respectively. The obtained WI was labelled as PMA-21.

Example 29: Synthesis of PMA-22

The polymerization methodology was adopted as described in the example 7 where the C14, C16, C18, C20, C22 and C24 acrylate monomers were taken in the molar ratio of 1:6:40:3:49.9:0.1 respectively. The obtained WI was labelled as PMA-22.

Example 30: Synthesis of PMA-23

The polymerization methodology was adopted as described in the example 7, wherein the C14, C16, C18, C20, C22 and C24 acrylate monomers were taken in the molar ratio of 1:6:25:2:65.9:0.1 respectively. The obtained WI was labelled as PMA-23.

Example 31: Synthesis of PMA-24

The polymerization methodology was adopted as described in the example 7, wherein the weights of C14 acrylate and poly alpha hexene monomers weight were 49.0 g and 1.0 g respectively. The obtained WI was labelled as PMA-24.

Example 32: Synthesis of PMA-25

The polymerization methodology was adopted as described in the example 7, wherein the weights of C16 acrylate and poly alpha hexene monomers were 49.0 g and 1.0 g respectively. The obtained WI was labelled as PMA-25.

Example 33: Synthesis of PMA-26

The polymerization methodology was adopted as described in the example 7, wherein the weights of C18 acrylate and poly alpha hexene monomers were 49.0 g and 1.0 g respectively. The obtained WI was labelled as PMA-26.

Example 34: Synthesis of PMA-27

The polymerization methodology was adopted as described in the example 7, wherein the weights of C20 acrylate and poly alpha hexene monomers were 49.0 g and 1.0 g respectively. The obtained WI was labelled as PMA-27.

Example 35: Synthesis of PMA-28

The polymerization methodology was adopted as described in the example 7, wherein the weights of C22 acrylate and poly alpha hexene monomers were 49.0 g and 1.0 g respectively. The obtained WI was labelled as PMA-28.

Example 36: Synthesis of PMA-29

The polymerization methodology was adopted as described in the example 7, wherein the weights of C24 acrylate and poly alpha hexene monomers were 49.0 g and 1.0 g respectively. The obtained WI was labelled as PMA-29.

Example 37: Synthesis of PMA-30

The polymerization methodology was adopted as described in the example 7, wherein the weights of C14 acrylate and poly alpha octene monomers were 49.0 g and 1.0 g respectively. The obtained WI was labelled as PMA-30.

Example 38: Synthesis of PMA-31

The polymerization methodology was adopted as described in the example 7, wherein the weights of C16 acrylate and poly alpha octene monomers were 49.0 g and 1.0 g respectively. The obtained WI was labelled as PMA-31.

Example 39: Synthesis of PMA-32

The polymerization methodology was adopted as described in the example 7, wherein the weights of C18 acrylate and poly alpha octene monomers were 49.0 g and 1.0 g respectively. The obtained WI was labelled as PMA-32.

Example 40: Synthesis of PMA-33

The polymerization methodology was adopted as described in the example 7, wherein the weights of C20 acrylate and poly alpha octene monomers were 49.0 g and 1.0 g respectively. The obtained WI was labelled as PMA-33.

Example 41: Synthesis of PMA-34

The polymerization methodology was adopted as described in the example 7, wherein the weights of C22 acrylate and poly alpha octene monomers were 49.0 g and 1.0 g respectively. The obtained WI was labelled as PMA-34.

Example 42: Synthesis of PMA-35

The polymerization methodology was adopted as described in the example 7, wherein the weights of C24 acrylate and poly alpha octene monomers were 49.0 g and 1.0 g respectively. The obtained WI was labelled as PMA-35.

Example 43: Synthesis of PMA-36

The polymerization methodology was adopted as described in the example 7, where the weights of C14 acrylate and poly alpha decene monomers were 49.0 g and 1.0 g respectively. The obtained WI was labelled as PMA-36.

Example 44: Synthesis of PMA-37

The polymerization methodology was adopted as described in the example 7, where the weights of C16 acrylate and poly alpha decene monomers weight are 49.0 g and 1.0 g respectively. The obtained WI was labelled as PMA-37.

Example 45: Synthesis of PMA-38

The polymerization methodology was adopted as described in the example 7, where the weights of C18 acrylate and poly alpha decene monomers were 49.0 g and 1.0 g respectively. The obtained WI was labelled as PMA-38.

Example 46: Synthesis of PMA-39

The polymerization methodology was adopted as described in the example 7, where the weights of C20 acrylate and poly alpha decene monomers were 49.0 g and 1.0 g respectively. The obtained WI was labelled as PMA-39.

Example 47: Synthesis of PMA-40

The polymerization methodology was adopted as described in the example 7, where the weights of C22 acrylate and poly alpha decene monomers were 49.0 g and 1.0 g respectively. The obtained WI was labelled as PMA-40.

Example 48: Synthesis of PMA-41

The polymerization methodology was adopted as described in the example 7, where the weights of C24 acrylate and poly alpha decene monomers were 49.0 g and 1.0 g respectively. The obtained WI was labelled as PMA-41.

Example 49: Synthesis of PMA-42

The polymerization methodology was adopted as described in the example 7, where the weights of C14 acrylate and poly alpha dodecene monomers were 49.0 g and 1.0 g respectively. The obtained WI was labelled as PMA-42.

Example 50: Synthesis of PMA-43

The polymerization methodology was adopted as described in the example 7, where the weights of C16 acrylate and poly alpha dodecene monomers were 49.0 g and 1.0 g respectively. The obtained WI was labelled as PMA-43.

Example 51: Synthesis of PMA-44

The polymerization methodology was adopted as described in the example 7, where the weights of C18 acrylate and poly alpha dodecene monomers were 49.0 g and 1.0 g respectively. The obtained WI was labelled as PMA-44.

Example 52: Synthesis of PMA-45

The polymerization methodology was adopted as described in the example 7, where the weights of C20 acrylate and poly alpha dodecene monomers were 49.0 g and 1.0 g respectively. The obtained WI was labelled as PMA-45.

Example 53: Synthesis of PMA-46

The polymerization methodology was adopted as described in the example 7, where the C22 acrylate and poly alpha dodecene monomers weights were 49.0 g and 1.0 g respectively. The obtained WI was labelled as PMA-46.

Example 54: Synthesis of PMA-47

The polymerization methodology was adopted as described in the example 7 where the weights of C24 acrylate and poly alpha dodecene monomers were 49.0 g and 1.0 g respectively. The obtained WI was labelled as PMA-47.

Example 55: Synthesis of PMA-48

The polymerization methodology was adopted as described in the example 29 where the weights of C14-C24 acrylate and poly alpha olefins of decene monomers were 49.0 g and 1.0 g respectively. The C14, C16, C18, C20, C22 and C24 acrylate monomers were taken in the molar ratio of 1:6:40:3:49.9:0.1 respectively. The obtained WI was labelled as PMA-48.

Example 56: Synthesis of PMA-49

The polymerization methodology was adopted as described in the example 30 where the weights of C14-C24 acrylate and poly alpha decene monomers were 49.0 g and 1.0 g respectively. The C14, C16, C18, C20, C22 and C24 acrylate monomers were taken in the molar ratio of 1:6:25:2:65.9:0.1 respectively. The obtained WI was labelled as PMA-49.

Example 57: Synthesis of PMA-50

The polymerization methodology was adopted as described in the example 29 where the weights of C14-C24 acrylates and mixture of poly alpha olefins of C6-C12 carbon chain monomer were 49.0 g and 1.0 g respectively. The C14, C16, C18, C20, C22 and C24 acrylate monomers were in the molar ratio of 1:6:40:3:49.9:0.1. The obtained WI was labelled as PMA-50.

Example 58: Synthesis of PMA-51

The polymerization methodology was adopted as described in the example 30 where the weights of C14-C24 acrylate and mixture of poly alpha olefins of C6-C12 carbon chain monomer were 49.0 g and 1.0 g respectively. The C14, C16, C18, C20, C22 and C24 acrylate monomers were taken in the molar ratio of 1:6:25:2:65.9:0.1. The obtained WI was labelled as PMA-51.

Example 59: Synthesis of PMA-52

The polymerization methodology was adopted as described in the example 30 where poly alpha olefin content was 0.01 wt %. The obtained PMA-52 was a copolymer of C14-C24 fatty alcohol acrylates with 0.01 wt % of polyalpha dodecane.

Example 60: Synthesis of PMA-53

The polymerization methodology was adopted as described in the example 30 where poly alpha olefin content was 20 wt %.

Example 61: Wax Deposition in the Lab Scale Flow Loop

The wax deposition studies under flowing condition have been carried out in a lab scale flow loop assembly whose schematic diagram is shown in FIG. 1.

This assembly consisted of a jacketed 25 cm long stainless steel pipeline having a 6 mm ID for measuring deposition and a heated crude oil storage tank. The crude oil is pumped from this storage tank through the SS pipeline maintained at lower temperature by circulating water in the jacket of oil storage tank as well as SS pipeline. In such type of flow loop equilibrium is attained after a time when the rate of wax deposition and rate of dissolution become equal. To obtain the equilibrium time for present set of experiments, initially one liter of hot crude oil at 40° C. was circulated for duration of 2, 4, 6, 8 & 10 hours with the SS pipeline maintained at 20 and 15° C. The amount of wax deposited was measured and it was observed that equilibrium was attained in 4-6 hours. Hence in the present set of experiments all the wax deposition experiments were carried out for 5 hours.

The physico-chemical properties of typical crude oil from Upper Assam basin are given in the following table 1. The crude oil constitutes 9.8% naphtha, 43% middle distillates, 38% VGO and 8.5% VR fraction.

TABLE 1

Physico-chemical characterization of crude oil of API 26

| Properties | Results |
|---|---|
| Density, $g/cm^3$ at 15° C. | 0.8968 |
| Pour point, ° C., ASTM D97 | 15 |
| Kinematic Viscosity, $mm^2/s$ at 40° C. | 7.325 |
| Dynamic Viscosity mPa · s at 40° C. | 6.424 |
| WAT | 32° C. |
| Asphaltene content, (wt %) | 2.4 |
| Wax content, (wt %) | 5.43 |
| Sulphur, (wt %) | 0.175 |
| Water content, (%) | 1.1 |
| SARA | |
| Saturates, (%) | 42.9 |
| Aromatics, (%) | 48.9 |
| Resins, (%) | 5.1 |

The carbon number distributions of crude oil and paraffins (Wax Deposit obtained from pipeline by pigging) are given in the following tables 2 and 3 analyzed through HTGC.

TABLE 2

Composition of crude oil analyzed through HTGC

| Carbon no. (n-alkane) | Peak Area (%) |
|---|---|
| 17 | 1.315 |
| 18 | 1.464 |
| 19 | 1.599 |
| 20 | 1.507 |
| 21 | 1.662 |
| 22 | 1.625 |
| 23 | 1.753 |
| 24 | 1.679 |
| 25 | 1.808 |
| 26 | 1.86 |
| 27 | 1.807 |
| 28 | 1.562 |
| 29 | 1.383 |
| 30 | 1.259 |
| 31 | 0.938 |
| 32 | 0.592 |
| 33 | 0.436 |
| 34 | 0.238 |
| 35 | 0.149 |
| 36 | 0.072 |
| 37 | 0.061 |
| 38 | 0.025 |
| 39 | 0.03 |
| 40 | 0.02 |
| 41 | 0.012 |
| 42 | 0.012 |
| 43 | 0.014 |
| 44 | 0.016 |
| 45 | 0.012 |
| 46 | 0.012 |
| 47 | 0.011 |
| 48 | 0.012 |
| 49 | 0.007 |
| 50 | 0.005 |
| 51 | 0.005 |
| 52 | 0.003 |

TABLE 3

Composition of Wax Deposit obtained from pipeline by pigging analyzed through high temperature gas chromatograph (HTGC)

| Carbon no. (n-alkane) | Peak Area (%) |
|---|---|
| 17 | 0.312 |
| 18 | 0.29 |
| 19 | 0.316 |
| 20 | 0.305 |
| 21 | 0.309 |
| 22 | 0.343 |
| 23 | 0.361 |
| 24 | 0.404 |
| 25 | 0.572 |
| 26 | 0.912 |
| 27 | 1.677 |
| 28 | 2.998 |
| 29 | 5.359 |
| 30 | 7.134 |
| 31 | 9.913 |
| 32 | 9.475 |
| 33 | 11.001 |
| 34 | 7.037 |
| 35 | 5.615 |
| 36 | 3.008 |
| 37 | 2.489 |
| 38 | 1.556 |
| 39 | 1.264 |
| 40 | 0.844 |
| 41 | 0.826 |
| 42 | 0.656 |
| 43 | 0.648 |
| 44 | 0.504 |
| 45 | 0.487 |
| 46 | 0.391 |
| 47 | 0.361 |
| 48 | 0.274 |
| 49 | 0.225 |
| 50 | 0.166 |
| 51 | 0.141 |
| 52 | 0.096 |
| 53 | 0.076 |
| 54 | 0.06 |
| 55 | 0.051 |
| 56 | 0.03 |
| 57 | 0.025 |
| 58 | 0.017 |
| 59 | 0.018 |
| 60 | 0.01 |
| 61 | 0.012 |
| 62 | 0.006 |
| 63 | 0.007 |
| 64 | 0.003 |
| 65 | 0.004 |

Method for Preparation of Polymeric Additive Doped Crude Oil

Homogenization of the Sample

The jars of 10 or 20 L of crude oil are heated at 85° C. for 3 h to homogenize the crude oil. The oil is then poured into bottles of 2000 mL capacity each and stored at ambient conditions.

In order to start the study, the stored crude oil is put into oven and heated at 95° C. for 30 minute.

Base Sample Preparation

Take an empty beaker of 1 L for sampling

Add 0.168 g (0.034 wt %) Xylene at ambient temperature in the beaker then add 550 mL of the heated crude oil in the beaker The sample so prepared is stirred at 450 RPM, 70° C. for 15 minute Additive Doped Sample Preparation Take an empty beaker of 1 L for sampling and add additive of amount 0.55 g i.e., 1000 ppm (add 0.22 g of additives if prepare a dose with 400 ppm) in the beaker at ambient temperature After adding additive we add 0.168 g (0.034 wt %) Xylene at ambient temperature in the beaker Add 550 mL of hot crude oil in the beaker The sample so prepared is stirred with the help of magnetic bead at 450 RPM and 70° C.

One liter each of crude oil sample is circulated through the SS pipeline for 5 hours maintained at different cold temperatures viz. 10° C. and 15° C. The cold flow temperatures have been considered based on the ambient conditions (12° C.) prevalent in during different seasons in Upper Assam basin. After 5 h, the crude oil adhering to the surface is removed by applying air pressure and discarded. Subsequently the temperature of the pipeline is gradually raised to 70° C. with constant air blowing followed by pigging. The weight of the material collected is recorded as the weight of paraffin or wax deposited at 15° C. and 10° C. and are given in tables 4 and 5 respectively Example 61.1

The same flow loop experiments as described in example 58 were evaluated with the different WIs from PMA-1 to PMA-53 at dosage of 1000 ppm and at 15° C. The results are given in Table-4

Example 61.2

The same flow loop experiments as described in example 58 were evaluated with the different WIs from PMA-1 to PMA-53 at dosage of 500 ppm and at 15° C. The results are given in Table-4

Example 61.3

The same flow loop experiments as described in example 58 were evaluated with the different WIs from PMA-1 to PMA-53 at dosage of 1000 ppm and at 10° C. The results are given in Table-5

Example 61.4

The same flow loop experiments as described in example 58 were evaluated with the different WIs from PMA-1 to PMA-53 at dosage of 500 ppm and at 10° C. The results are given in Table-5

TABLE 4

Flow loop wax deposition at 15° C. using different PMA additive (PMA 1 to PMA53) for 5 hours duration

| S. No | Hot bath temperature (° C.) | Cold bath temperature (° C.) | Solvent (Xylene, wt %) | Additive | Additive conc. (ppm) | Wax recovered during Pig (g) | % reduction in wax deposition |
|---|---|---|---|---|---|---|---|
| 1 | 40 | 15 | 0.034 | No | No | 7.93 | — |
| 2 | 40 | 15 | 0.034 | PMA-1 | 1000 | 4.996 | 37 |
| 3 | 40 | 15 | 0.034 | PMA-1 | 500 | 5.630 | 29 |
| 4 | 40 | 15 | 0.034 | PMA-2 | 1000 | 4.917 | 38 |
| 5 | 40 | 15 | 0.034 | PMA-2 | 500 | 5.630 | 29 |
| 6 | 40 | 15 | 0.034 | PMA-3 | 1000 | 4.679 | 41 |
| 7 | 40 | 15 | 0.034 | PMA-3 | 500 | 5.313 | 33 |
| 8 | 40 | 15 | 0.034 | PMA-4 | 1000 | 4.362 | 45 |
| 9 | 40 | 15 | 0.034 | PMA-4 | 500 | 4.758 | 40 |
| 10 | 40 | 15 | 0.034 | PMA-5 | 1000 | 4.203 | 47 |
| 11 | 40 | 15 | 0.034 | PMA-5 | 500 | 4.679 | 41 |
| 12 | 40 | 15 | 0.034 | PMA-6 | 1000 | 4.837 | 39 |
| 13 | 40 | 15 | 0.034 | PMA-6 | 500 | 5.392 | 32 |
| 14 | 40 | 15 | 0.034 | PMA-7 | 1000 | 4.520 | 43 |
| 15 | 40 | 15 | 0.034 | PMA-7 | 500 | 5.155 | 35 |
| 16 | 40 | 15 | 0.034 | PMA-8 | 1000 | 4.282 | 46 |
| 17 | 40 | 15 | 0.034 | PMA-8 | 500 | 4.837 | 39 |
| 18 | 40 | 15 | 0.034 | PMA-9 | 1000 | 3.886 | 51 |
| 19 | 40 | 15 | 0.034 | PMA-9 | 500 | 4.441 | 44 |
| 20 | 40 | 15 | 0.034 | PMA-10 | 1000 | 3.569 | 55 |
| 21 | 40 | 15 | 0.034 | PMA-10 | 500 | 4.124 | 48 |
| 22 | 40 | 15 | 0.034 | PMA-11 | 1000 | 3.172 | 60 |
| 23 | 40 | 15 | 0.034 | PMA-11 | 500 | 3.806 | 52 |
| 24 | 40 | 15 | 0.034 | PMA-12 | 1000 | 2.458 | 69 |
| 25 | 40 | 15 | 0.034 | PMA-12 | 500 | 3.648 | 54 |
| 26 | 40 | 15 | 0.034 | PMA-13 | 1000 | 2.141 | 73 |
| 27 | 40 | 15 | 0.034 | PMA-13 | 500 | 3.093 | 61 |
| 28 | 40 | 15 | 0.034 | PMA-14 | 1000 | 1.745 | 78 |
| 29 | 40 | 15 | 0.034 | PMA-14 | 500 | 2.617 | 67 |
| 30 | 40 | 15 | 0.034 | PMA-15 | 1000 | 1.586 | 80 |
| 31 | 40 | 15 | 0.034 | PMA-15 | 500 | 2.300 | 71 |
| 32 | 40 | 15 | 0.034 | PMA-16 | 1000 | 1.348 | 83 |
| 33 | 40 | 15 | 0.034 | PMA-16 | 500 | 2.141 | 73 |
| 34 | 40 | 15 | 0.034 | PMA-17 | 1000 | 1.586 | 80 |
| 35 | 40 | 15 | 0.034 | PMA-17 | 500 | 1.983 | 75 |

TABLE 4-continued

Flow loop wax deposition at 15° C. using different PMA additive (PMA 1 to PMA53) for 5 hours duration

| S. No | Hot bath temperature (° C.) | Cold bath temperature (° C.) | Solvent (Xylene, wt %) | Additive | Additive conc. (ppm) | Wax recovered during Pig (g) | % reduction in wax deposition |
|---|---|---|---|---|---|---|---|
| 36 | 40 | 15 | 0.034 | PMA-18 | 1000 | 1.427 | 82 |
| 37 | 40 | 15 | 0.034 | PMA-18 | 500 | 2.538 | 68 |
| 38 | 40 | 15 | 0.034 | PMA-19 | 1000 | 2.220 | 72 |
| 39 | 40 | 15 | 0.034 | PMA-19 | 500 | 3.251 | 59 |
| 40 | 40 | 15 | 0.034 | PMA-20 | 1000 | 1.903 | 76 |
| 41 | 40 | 15 | 0.034 | PMA-20 | 500 | 3.648 | 54 |
| 42 | 40 | 15 | 0.034 | PMA-21 | 1000 | 2.300 | 71 |
| 43 | 40 | 15 | 0.034 | PMA-21 | 500 | 3.251 | 59 |
| 44 | 40 | 15 | 0.034 | PMA-22 | 1000 | 0.952 | 88 |
| 45 | 40 | 15 | 0.034 | PMA-22 | 500 | 3.331 | 58 |
| 46 | 40 | 15 | 0.034 | PMA-23 | 1000 | 0.793 | 90 |
| 47 | 40 | 15 | 0.034 | PMA-23 | 500 | 3.331 | 58 |
| 48 | 40 | 15 | 0.034 | PMA-24 | 1000 | 1.190 | 85 |
| 49 | 40 | 15 | 0.034 | PMA-24 | 500 | 3.648 | 54 |
| 50 | 40 | 15 | 0.034 | PMA-25 | 1000 | 1.507 | 81 |
| 51 | 40 | 15 | 0.034 | PMA-25 | 500 | 4.044 | 49 |
| 52 | 40 | 15 | 0.034 | PMA-26 | 1000 | 1.903 | 76 |
| 53 | 40 | 15 | 0.034 | PMA-26 | 500 | 4.758 | 40 |
| 54 | 40 | 15 | 0.034 | PMA-27 | 1000 | 2.300 | 71 |
| 55 | 40 | 15 | 0.034 | PMA-27 | 500 | 5.075 | 36 |
| 56 | 40 | 15 | 0.034 | PMA-28 | 1000 | 2.776 | 65 |
| 57 | 40 | 15 | 0.034 | PMA-28 | 500 | 5.551 | 30 |
| 58 | 40 | 15 | 0.034 | PMA-29 | 1000 | 1.507 | 81 |
| 59 | 40 | 15 | 0.034 | PMA-29 | 500 | 2.538 | 68 |
| 60 | 40 | 15 | 0.034 | PMA-30 | 1000 | 3.093 | 61 |
| 61 | 40 | 15 | 0.034 | PMA-30 | 500 | 5.392 | 32 |
| 62 | 40 | 15 | 0.034 | PMA-31 | 1000 | 2.696 | 66 |
| 63 | 40 | 15 | 0.034 | PMA-31 | 500 | 4.520 | 43 |
| 64 | 40 | 15 | 0.034 | PMA-32 | 1000 | 2.538 | 68 |
| 65 | 40 | 15 | 0.034 | PMA-32 | 500 | 4.044 | 49 |
| 66 | 40 | 15 | 0.034 | PMA-33 | 1000 | 2.141 | 73 |
| 67 | 40 | 15 | 0.034 | PMA-33 | 500 | 3.886 | 51 |
| 68 | 40 | 15 | 0.034 | PMA-34 | 1000 | 1.745 | 78 |
| 69 | 40 | 15 | 0.034 | PMA-34 | 500 | 3.489 | 56 |
| 70 | 40 | 15 | 0.034 | PMA-35 | 1000 | 1.507 | 81 |
| 71 | 40 | 15 | 0.034 | PMA-35 | 500 | 3.251 | 59 |
| 72 | 40 | 15 | 0.034 | PMA-36 | 1000 | 4.441 | 44 |
| 73 | 40 | 15 | 0.034 | PMA-36 | 500 | 5.155 | 35 |
| 74 | 40 | 15 | 0.034 | PMA-37 | 1000 | 3.886 | 51 |
| 75 | 40 | 15 | 0.034 | PMA-37 | 500 | 4.917 | 38 |
| 76 | 40 | 15 | 0.034 | PMA-38 | 1000 | 2.934 | 63 |
| 77 | 40 | 15 | 0.034 | PMA-38 | 500 | 4.679 | 41 |
| 78 | 40 | 15 | 0.034 | PMA-39 | 1000 | 2.220 | 72 |
| 79 | 40 | 15 | 0.034 | PMA-39 | 500 | 3.489 | 56 |
| 80 | 40 | 15 | 0.034 | PMA-40 | 1000 | 1.586 | 80 |
| 81 | 40 | 15 | 0.034 | PMA-40 | 500 | 3.410 | 57 |
| 82 | 40 | 15 | 0.034 | PMA-41 | 1000 | 1.269 | 84 |
| 83 | 40 | 15 | 0.034 | PMA-41 | 500 | 2.776 | 65 |
| 84 | 40 | 15 | 0.034 | PMA-42 | 1000 | 4.362 | 45 |
| 85 | 40 | 15 | 0.034 | PMA-42 | 500 | 5.155 | 35 |
| 86 | 40 | 15 | 0.034 | PMA-43 | 1000 | 3.727 | 53 |
| 87 | 40 | 15 | 0.034 | PMA-43 | 500 | 4.679 | 41 |
| 88 | 40 | 15 | 0.034 | PMA-44 | 1000 | 2.776 | 65 |
| 89 | 40 | 15 | 0.034 | PMA-44 | 500 | 4.441 | 44 |
| 90 | 40 | 15 | 0.034 | PMA-45 | 1000 | 1.903 | 76 |
| 91 | 40 | 15 | 0.034 | PMA-45 | 500 | 3.172 | 60 |
| 92 | 40 | 15 | 0.034 | PMA-46 | 1000 | 1.427 | 82 |
| 93 | 40 | 15 | 0.034 | PMA-46 | 500 | 3.093 | 61 |
| 94 | 40 | 15 | 0.034 | PMA-47 | 1000 | 1.190 | 85 |
| 95 | 40 | 15 | 0.034 | PMA-47 | 500 | 2.855 | 64 |
| 96 | 40 | 15 | 0.034 | PMA-48 | 1000 | 0.872 | 89 |
| 97 | 40 | 15 | 0.034 | PMA-48 | 500 | 3.172 | 60 |
| 98 | 40 | 15 | 0.034 | PMA-49 | 1000 | 0.714 | 91 |
| 99 | 40 | 15 | 0.034 | PMA-49 | 500 | 3.172 | 60 |
| 100 | 40 | 15 | 0.034 | PMA-50 | 1000 | 1.190 | 85 |
| 101 | 40 | 15 | 0.034 | PMA-50 | 500 | 3.331 | 58 |
| 102 | 40 | 15 | 0.034 | PMA-51 | 1000 | 1.031 | 87 |
| 103 | 40 | 15 | 0.034 | PMA-51 | 500 | 3.251 | 59 |
| 104 | 40 | 15 | 0.034 | PMA-52 | 1000 | 0.794 | 90 |
| 105 | 40 | 15 | 0.034 | PMA-52 | 500 | 3.172 | 60 |

TABLE 4-continued

Flow loop wax deposition at 15° C. using different PMA additive (PMA 1 to PMA53) for 5 hours duration

| S. No | Hot bath temperature (° C.) | Cold bath temperature (° C.) | Solvent (Xylene, wt %) | Additive | Additive conc. (ppm) | Wax recovered during Pig (g) | % reduction in wax deposition |
|---|---|---|---|---|---|---|---|
| 106 | 40 | 15 | 0.034 | PMA-53 | 1000 | 2.936 | 62 |
| 107 | 40 | 15 | 0.034 | PMA-53 | 500 | 4.681 | 40 |

TABLE 5

Flow loop wax Deposition at 10° C. using different PMA additives for 5 hours duration.

| S. No. | Hot bath temperature (° C.) | Cold bath temperature (° C.) | Solvent (Xylene wt %) | Additive | Additive conc. (ppm) | Pig (g) | % reduction in wax deposition |
|---|---|---|---|---|---|---|---|
| 1 | 40 | 10 | 0.034 | No | No | 10.7 | — |
| 2 | 40 | 10 | 0.034 | PMA-1 | 1000 | 7.811 | 27 |
| 3 | 40 | 10 | 0.034 | PMA-1 | 500 | 8.667 | 19 |
| 4 | 40 | 10 | 0.034 | PMA-2 | 1000 | 8.132 | 24 |
| 5 | 40 | 10 | 0.034 | PMA-2 | 500 | 8.774 | 18 |
| 6 | 40 | 10 | 0.034 | PMA-3 | 1000 | 7.918 | 26 |
| 7 | 40 | 10 | 0.034 | PMA-3 | 500 | 8.667 | 19 |
| 8 | 40 | 10 | 0.034 | PMA-4 | 1000 | 6.955 | 35 |
| 9 | 40 | 10 | 0.034 | PMA-4 | 500 | 7.704 | 28 |
| 10 | 40 | 10 | 0.034 | PMA-5 | 1000 | 6.848 | 36 |
| 11 | 40 | 10 | 0.034 | PMA-5 | 500 | 7.383 | 31 |
| 12 | 40 | 10 | 0.034 | PMA-6 | 1000 | 6.955 | 35 |
| 13 | 40 | 10 | 0.034 | PMA-6 | 500 | 7.811 | 27 |
| 14 | 40 | 10 | 0.034 | PMA-7 | 1000 | 6.313 | 41 |
| 15 | 40 | 10 | 0.034 | PMA-7 | 500 | 7.276 | 32 |
| 16 | 40 | 10 | 0.034 | PMA-8 | 1000 | 6.420 | 40 |
| 17 | 40 | 10 | 0.034 | PMA-8 | 500 | 7.276 | 32 |
| 18 | 40 | 10 | 0.034 | PMA-9 | 1000 | 6.099 | 43 |
| 19 | 40 | 10 | 0.034 | PMA-9 | 500 | 6.741 | 37 |
| 20 | 40 | 10 | 0.034 | PMA-10 | 1000 | 5.564 | 48 |
| 21 | 40 | 10 | 0.034 | PMA-10 | 500 | 6.099 | 43 |
| 22 | 40 | 10 | 0.034 | PMA-11 | 1000 | 5.350 | 50 |
| 23 | 40 | 10 | 0.034 | PMA-11 | 500 | 6.313 | 41 |
| 24 | 40 | 10 | 0.034 | PMA-12 | 1000 | 4.494 | 58 |
| 25 | 40 | 10 | 0.034 | PMA-12 | 500 | 6.099 | 43 |
| 26 | 40 | 10 | 0.034 | PMA-13 | 1000 | 5.029 | 53 |
| 27 | 40 | 10 | 0.034 | PMA-13 | 500 | 6.527 | 39 |
| 28 | 40 | 10 | 0.034 | PMA-14 | 1000 | 5.029 | 53 |
| 29 | 40 | 10 | 0.034 | PMA-14 | 500 | 6.099 | 43 |
| 30 | 40 | 10 | 0.034 | PMA-15 | 1000 | 4.815 | 55 |
| 31 | 40 | 10 | 0.034 | PMA-15 | 500 | 5.457 | 49 |
| 32 | 40 | 10 | 0.034 | PMA-16 | 1000 | 4.494 | 58 |
| 33 | 40 | 10 | 0.034 | PMA-16 | 500 | 5.243 | 51 |
| 34 | 40 | 10 | 0.034 | PMA-17 | 1000 | 4.066 | 62 |
| 35 | 40 | 10 | 0.034 | PMA-17 | 500 | 5.136 | 52 |
| 36 | 40 | 10 | 0.034 | PMA-18 | 1000 | 4.601 | 57 |
| 37 | 40 | 10 | 0.034 | PMA-18 | 500 | 5.243 | 51 |
| 38 | 40 | 10 | 0.034 | PMA-19 | 1000 | 5.457 | 49 |
| 39 | 40 | 10 | 0.034 | PMA-19 | 500 | 6.527 | 39 |
| 40 | 40 | 10 | 0.034 | PMA-20 | 1000 | 5.243 | 51 |
| 41 | 40 | 10 | 0.034 | PMA-20 | 500 | 5.885 | 45 |
| 42 | 40 | 10 | 0.034 | PMA-21 | 1000 | 3.852 | 64 |
| 43 | 40 | 10 | 0.034 | PMA-21 | 500 | 4.922 | 54 |
| 44 | 40 | 10 | 0.034 | PMA-22 | 1000 | 4.173 | 61 |
| 45 | 40 | 10 | 0.034 | PMA-22 | 500 | 5.671 | 47 |
| 46 | 40 | 10 | 0.034 | PMA-23 | 1000 | 4.066 | 62 |
| 47 | 40 | 10 | 0.034 | PMA-23 | 500 | 5.457 | 49 |
| 48 | 40 | 10 | 0.034 | PMA-24 | 1000 | 4.494 | 58 |
| 49 | 40 | 10 | 0.034 | PMA-24 | 500 | 5.671 | 47 |
| 50 | 40 | 10 | 0.034 | PMA-25 | 1000 | 4.280 | 60 |
| 51 | 40 | 10 | 0.034 | PMA-25 | 500 | 5.992 | 44 |
| 52 | 40 | 10 | 0.034 | PMA-26 | 1000 | 5.243 | 51 |
| 53 | 40 | 10 | 0.034 | PMA-26 | 500 | 6.420 | 40 |
| 54 | 40 | 10 | 0.034 | PMA-27 | 1000 | 5.136 | 52 |
| 55 | 40 | 10 | 0.034 | PMA-27 | 500 | 6.634 | 38 |
| 56 | 40 | 10 | 0.034 | PMA-28 | 1000 | 5.671 | 47 |

TABLE 5-continued

Flow loop wax Deposition at 10° C. using different PMA additives for 5 hours duration.

| S. No. | Hot bath temperature (° C.) | Cold bath temperature (° C.) | Solvent (Xylene wt %) | Additive | Additive conc. (ppm) | Pig (g) | % reduction in wax deposition |
|---|---|---|---|---|---|---|---|
| 57 | 40 | 10 | 0.034 | PMA-28 | 500 | 7.597 | 29 |
| 58 | 40 | 10 | 0.034 | PMA-29 | 1000 | 4.066 | 62 |
| 59 | 40 | 10 | 0.034 | PMA-29 | 500 | 5.350 | 50 |
| 60 | 40 | 10 | 0.034 | PMA-30 | 1000 | 5.029 | 53 |
| 61 | 40 | 10 | 0.034 | PMA-30 | 500 | 6.955 | 35 |
| 62 | 40 | 10 | 0.034 | PMA-31 | 1000 | 5.136 | 52 |
| 63 | 40 | 10 | 0.034 | PMA-31 | 500 | 6.527 | 39 |
| 64 | 40 | 10 | 0.034 | PMA-32 | 1000 | 5.029 | 53 |
| 65 | 40 | 10 | 0.034 | PMA-32 | 500 | 6.099 | 43 |
| 66 | 40 | 10 | 0.034 | PMA-33 | 1000 | 4.922 | 54 |
| 67 | 40 | 10 | 0.034 | PMA-33 | 500 | 5.885 | 45 |
| 68 | 40 | 10 | 0.034 | PMA-34 | 1000 | 4.708 | 56 |
| 69 | 40 | 10 | 0.034 | PMA-34 | 500 | 5.885 | 45 |
| 70 | 40 | 10 | 0.034 | PMA-35 | 1000 | 4.280 | 60 |
| 71 | 40 | 10 | 0.034 | PMA-35 | 500 | 5.564 | 48 |
| 72 | 40 | 10 | 0.034 | PMA-36 | 1000 | 6.206 | 42 |
| 73 | 40 | 10 | 0.034 | PMA-36 | 500 | 7.383 | 31 |
| 74 | 40 | 10 | 0.034 | PMA-37 | 1000 | 5.992 | 44 |
| 75 | 40 | 10 | 0.034 | PMA-37 | 500 | 7.490 | 30 |
| 76 | 40 | 10 | 0.034 | PMA-38 | 1000 | 5.671 | 47 |
| 77 | 40 | 10 | 0.034 | PMA-38 | 500 | 7.383 | 31 |
| 78 | 40 | 10 | 0.034 | PMA-39 | 1000 | 5.029 | 53 |
| 79 | 40 | 10 | 0.034 | PMA-39 | 500 | 5.992 | 44 |
| 80 | 40 | 10 | 0.034 | PMA-40 | 1000 | 4.815 | 55 |
| 81 | 40 | 10 | 0.034 | PMA-40 | 500 | 5.671 | 47 |
| 82 | 40 | 10 | 0.034 | PMA-41 | 1000 | 4.815 | 55 |
| 83 | 40 | 10 | 0.034 | PMA-41 | 500 | 5.564 | 48 |
| 84 | 40 | 10 | 0.034 | PMA-42 | 1000 | 7.062 | 34 |
| 85 | 40 | 10 | 0.034 | PMA-42 | 500 | 7.811 | 27 |
| 86 | 40 | 10 | 0.034 | PMA-43 | 1000 | 6.313 | 41 |
| 87 | 40 | 10 | 0.034 | PMA-43 | 500 | 7.490 | 30 |
| 88 | 40 | 10 | 0.034 | PMA-44 | 1000 | 5.671 | 47 |
| 89 | 40 | 10 | 0.034 | PMA-44 | 500 | 7.276 | 32 |
| 90 | 40 | 10 | 0.034 | PMA-45 | 1000 | 5.457 | 49 |
| 91 | 40 | 10 | 0.034 | PMA-45 | 500 | 6.206 | 42 |
| 92 | 40 | 10 | 0.034 | PMA-46 | 1000 | 4.601 | 57 |
| 93 | 40 | 10 | 0.034 | PMA-46 | 500 | 5.564 | 48 |
| 94 | 40 | 10 | 0.034 | PMA-47 | 1000 | 4.280 | 60 |
| 95 | 40 | 10 | 0.034 | PMA-47 | 500 | 5.564 | 48 |
| 96 | 40 | 10 | 0.034 | PMA-48 | 1000 | 3.852 | 64 |
| 97 | 40 | 10 | 0.034 | PMA-48 | 500 | 5.029 | 53 |
| 98 | 40 | 10 | 0.034 | PMA-49 | 1000 | 3.745 | 65 |
| 99 | 40 | 10 | 0.034 | PMA-49 | 500 | 4.708 | 56 |
| 100 | 40 | 10 | 0.034 | PMA-50 | 1000 | 3.959 | 63 |
| 101 | 40 | 10 | 0.034 | PMA-50 | 500 | 5.457 | 49 |
| 102 | 40 | 10 | 0.034 | PMA-51 | 1000 | 3.852 | 64 |
| 103 | 40 | 10 | 0.034 | PMA-51 | 500 | 5.243 | 51 |
| 104 | 40 | 10 | 0.034 | PMA-52 | 1000 | 4.062 | 63 |
| 105 | 40 | 10 | 0.034 | PMA-52 | 500 | 5.453 | 48 |
| 106 | 40 | 10 | 0.034 | PMA-53 | 1000 | 5.991 | 44 |
| 107 | 40 | 10 | 0.034 | PMA-53 | 500 | 7.488 | 31 |

Advantages of the Invention

Synthesis of WI(s) using homopolymers and copolymers of C14 to C24 fatty alcohol, and an unsaturated organic acid i.e. acrylic acid and poly alpha olefins i.e. poly alpha hexene, poly alpha octene, poly alpha decene, poly alpha dodecene of composition ranging from about 0.01 wt % to 20 wt % wherein the average molecular weight of poly alpha olefins used ranged from 1000 to 10000 at elevated temperature (10° C. to 150° C.) for wax deposition reduction of waxy crude oils.

A two-step process for the production of WI(s) to check their activity on wax deposition reduction of waxy crude oils.

Use of different acid catalysts such as inorganic acids, HCl, $HNO_3$, $H_2SO_4$, $HClO_4$, $H_3PO_4$, $H_3PO_3$, organic acids, P-toluene sulfonic acid and alkali hydroxide, alkali oxides, carbonates, bicarbonates or alkali earth metal hydroxides, oxides, carbonates, bicarbonates, amberlyte resin for the synthesis of monomers of WI(s) using acrylic acid, and C14 to C24 fatty alcohols.

Use of initiators such as tert-Butyl hydrogen peroxide, 2,2'-azobis(isobutyrlonitrile), Benzoyl peroxide at a lower dosage for polymerization to produce homopolymers and copolymers of acrylates C14 to C24 fatty alcohols and polyalpha olefins.

Applicability of these additives (WIs) as wax inhibitors for crude oils having high paraffin carbon number (up to 65 or beyond).

We claim:

1. A wax inhibitor, comprising copolymers of:

80 wt % to 99.99 wt % of a C14 to C24 fatty unsaturated ester comprised of a monomer comprising a C14 to C24 fatty alcohol and an unsaturated organic acid; and 0.01 wt % to 20 wt % of a polyalpha olefin.

2. The wax inhibitor as claimed in claim 1, wherein the unsaturated organic acid is selected from the group consisting of acrylic acid, maleic anhydride, and maleic acid.

3. The wax inhibitor as claimed in claim 1, wherein the C14 to C24 fatty alcohol is selected from the group consisting of C14, C16, C18, C20, C22 and C24 alcohol.

4. The wax inhibitor as claimed in claim 1, wherein the polyalpha olefin is selected from the group consisting of polyalpha hexene, polyalpha octene, polyalpha decene, and polyalpha dodecene.

5. The wax inhibitor as claimed in claim 1, wherein the wax inhibitor is selected from the group consisting of:

i. copolymer of C14 fatty alcohol acrylate with polyalpha hexene;

ii. copolymer of C16 fatty alcohol acrylate with polyalpha hexene;

iii. copolymer of C18 fatty alcohol acrylate with polyalpha hexene;

iv. copolymer of C20 fatty alcohol acrylate with polyalpha hexene;

v. copolymer of C22 fatty alcohol acrylate with polyalpha hexene;

vi. copolymer of C24 fatty alcohol acrylate with polyalpha hexene;

vii. copolymer of C14 fatty alcohol acrylate with polyalpha octene;

viii. copolymer of C16 fatty alcohol acrylate with polyalpha octene;

ix. copolymer of C18 fatty alcohol acrylate with polyalpha octene;

x. copolymer of C20 fatty alcohol acrylate with polyalpha octene;

xi. copolymer of C22 fatty alcohol acrylate with polyalpha octene;

xii. copolymer of C24 fatty alcohol acrylate with polyalpha octene;

xiii. copolymer of C14 fatty alcohol acrylate with polyalpha decene;

xiv. copolymer of C16 fatty alcohol acrylate with polyalpha decene;

xv. copolymer of C18 fatty alcohol acrylate with polyalpha decene;

xvi. copolymer of C20 fatty alcohol acrylate with polyalpha decene;

xvii. copolymer of C22 fatty alcohol acrylate with polyalpha decene;

xviii. copolymer of C24 fatty alcohol acrylate with polyalpha decene;

xix. copolymer of C14 fatty alcohol acrylate with polyalpha dodecane;

xx. copolymer of C16 fatty alcohol acrylate with polyalpha dodecane;

xxi. copolymer of C18 fatty alcohol acrylate with polyalpha dodecane;

xxii. copolymer of C20 fatty alcohol acrylate with polyalpha dodecane;

xxiii. copolymer of C22 fatty alcohol acrylate with polyalpha dodecane;

xxiv. copolymer of C24 fatty alcohol acrylate with polyalpha dodecane;

xxv. copolymer of a mixture of C14-C24 fatty alcohol acrylates with polyalpha decene;

xxvi. copolymer of a mixture of C14-C24 fatty alcohol acrylates with polyalpha decene;

xxvii. copolymer of a mixture of C14-C24 fatty alcohol acrylates with polyalpha olefin of C6-C12;

xxviii. copolymer of a mixture of C14-C24 fatty alcohol acrylates with polyalpha olefin of C6-C12;

xxix. copolymer of a mixture of C14-C24 fatty alcohol acrylates with 0.01 wt % of polyalpha dodecane; and xxx. copolymer of a mixture of C14-C24 fatty alcohol acrylates with 20.0 wt % of polyalpha dodecane.

6. A process for synthesis of the wax inhibitor as claimed in claim 1, comprising the steps of:

a. reacting the C14 to C24 fatty alcohol and the unsaturated organic acid at a ratio ranging from 1:1 to 1:1.5, in the presence of a solvent, to obtain a first reaction mixture;

b. mixing the first reaction mixture as obtained in step (a) with a catalyst and a polymerization inhibitor in presence of the solvent and homogenizing for a period in a range of 1 to 15 minutes, followed by heating at a temperature in a range of 40° C. to 150° C. for a period in a range of 2 to 24 hours to obtain a monomer of the C14 to C24 fatty unsaturated ester;

c. solubilising the monomer of the C14 to C24 fatty unsaturated ester obtained in step (b) in an organic solvent and mixing with the polyalpha olefin in the presence of a polymerization initiator at a temperature in a range of 30° C. to 120° C. for a period in a range of 2 to 24 hours to obtain a second reaction mixture; and d. precipitating the second reaction mixture obtained in step (c) with an alcohol to obtain the wax inhibitor, wherein the C14 to C24 fatty alcohol, unsaturated organic acid and polyalpha olefin are in a weight ratio range of 0.495:0.495:0.01 to 0.40:0.40:0.20.

7. The process as claimed in claim 6, wherein the unsaturated organic acid is selected from the group consisting of acrylic acid, maleic anhydride, and maleic acid; the C14 to C24 fatty alcohol is selected from the group consisting of C14, C16, C18, C20, C22 and C24 alcohol; and the polyalpha olefin is selected from the group consisting of polyalpha hexene, polyalpha octene, polyalpha decene, and polyalpha dodecene.

8. The process as claimed in claim 6, wherein the solvent is selected from the group consisting of benzene, ethylbenzene, toluene, xylenes, mesitylene, trichlorobenzene, $CHCl_3$, tetrahydrofuran (THF), dioxane, and dimethyl formamide (DMF); and the catalyst is selected from the group consisting of HCl, $HNO_3$, $H_2SO_4$, $HClO_4$, $H_3PO_4$, $H_3PO_3$, organic acids, p-toluene sulfonic acid, alkali hydroxide, alkali oxides, carbonates, bicarbonates, alkali earth metal hydroxides, oxides, carbonates, bicarbonates and amberlyte resin.

9. The process as claimed in claim 6, wherein the polymerization initiator is selected from the group consisting of benzoyl peroxide, 2,2'-azobis(isobutyrlonitrile), tert-butyl hydrogen peroxide and $H_2O_2$; the polymerization inhibitor is selected from the group consisting of hydroquinone (HQ), 4-tert butyl catechol, methoxy hydroquinone (MEHQ), and butylated hydroxyl toluene (BHT); and the alcohol for precipitating the polymers in step (d) is selected from the group consisting of methanol, ethanol, propanol, and isopropanol.

10. A process for reducing wax deposition in waxy crude oil, comprising:

a. dissolving the wax inhibitor as claimed in claim 1, in a solvent selected from the group consisting of hexane, heptane, toluene, benzene, ethyl benzene, xylenes and mixtures thereof, to obtain a dissolved composition having a concentration of the wax inhibitor in a range of 0.01 to 70%; and b. adding the dissolved composition to a waxy crude oil at a concentration in the range of 5 ppm to 10000 ppm by weight at a temperature in a range of 5° C. to 10° C. above the wax appearing temperature (WAT) of the waxy crude oil.

* * * * *